Patented Feb. 2, 1954

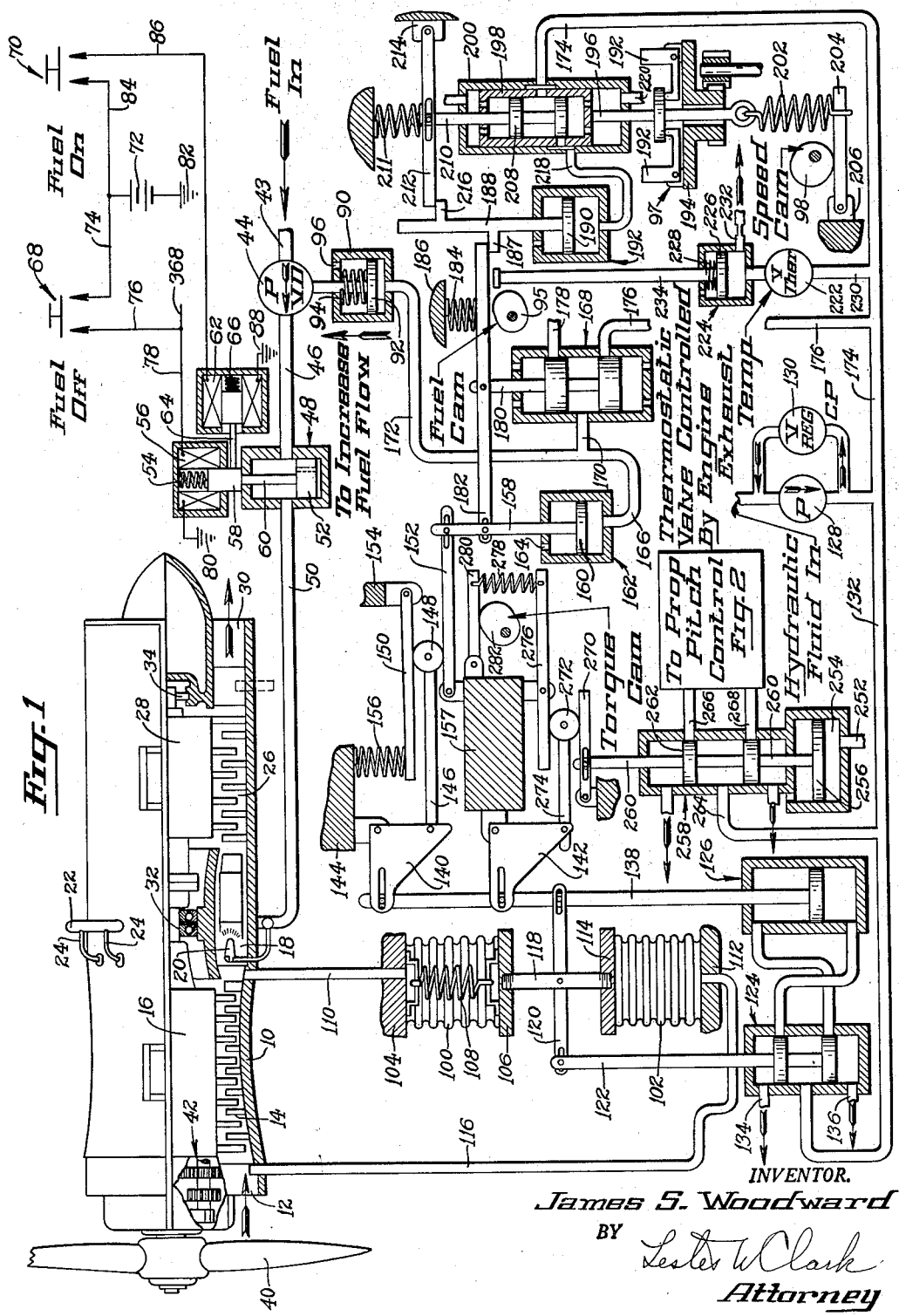

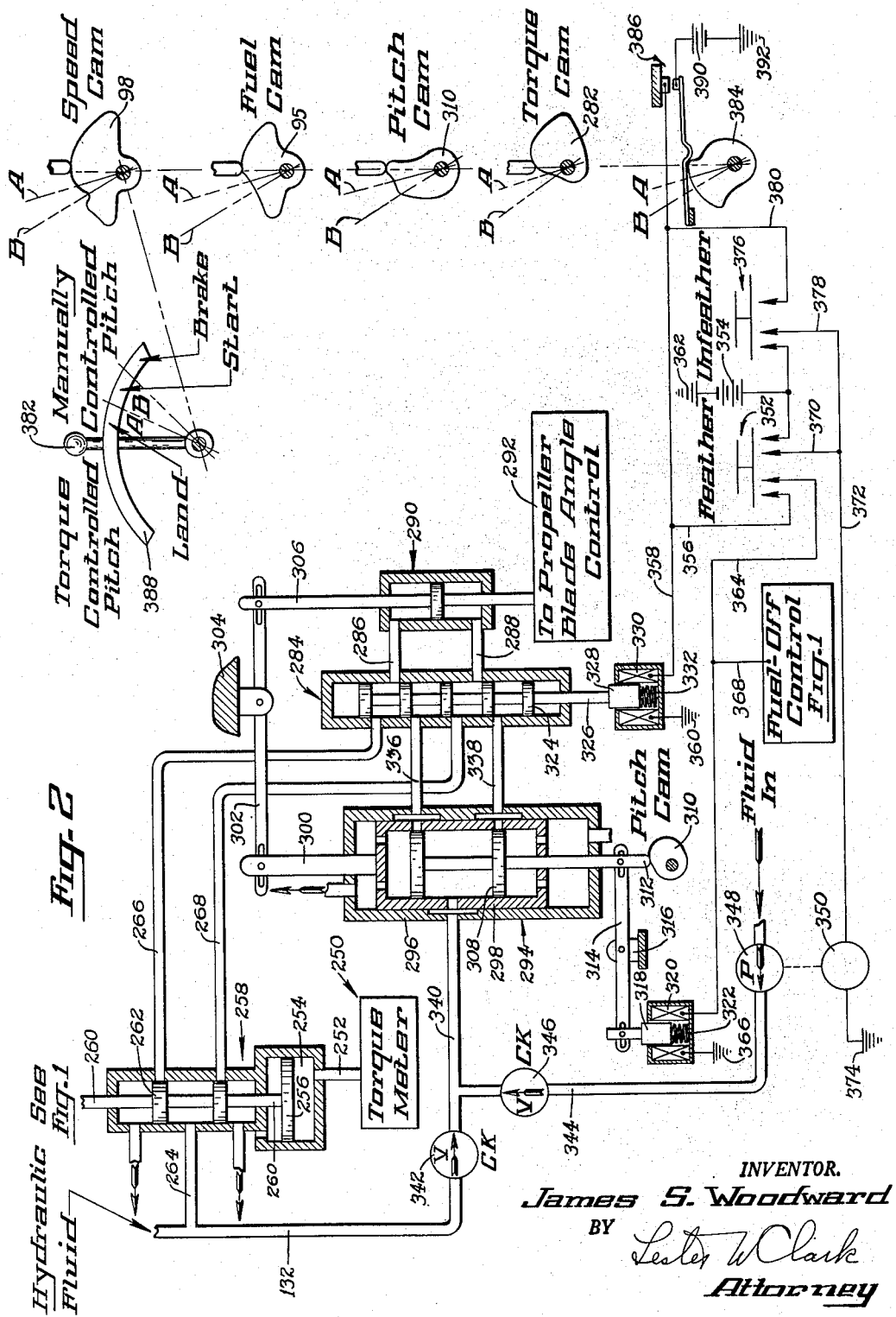

2,667,935

UNITED STATES PATENT OFFICE 2,667,935

AIRCRAFT PROPELLER AND ENGINE CONTROL SYSTEM

James S. Woodward, West Hartford, Conn., assignor to Niles-Bement-Pond Company, West Hartford, Conn., a corporation of New Jersey Application October 1, 1947, Serial No. 777,322

20 Claims. (Cl. 170—135.74)

The present invention relates to control apparatus for internal combustion engines, and particularly for aircraft engines driving variable pitch propellers.

The invention is illustrated as applied to a jet engine, although it may be applied to any internal combustion engine.

Such engines are commonly provided with means for controlling the supply of fuel to the engine and with means for varying the propeller pitch to control the torque load on the engine.

It is an object of the present invention to provide improved means for coordinating the operations of the fuel and torque control means for an engine of the type described.

Another object of the present invention is to provide an improved control system wherein a single manual control lever serves to regulate both the fuel supply and the torque load on an engine of the type described.

Another object is to provide improved means for coordinating the two controls in response to changes in the rate of combustion air flow through the engine, the engine speed, and the engine temperature.

A further object of the invention is to provide improved means for interlocking a single lever control of the type described with suitable engine starting and stopping controls and suitable propeller feathering and unfeathering controls.

Other advantages and objects of my invention will become apparent from a consideration of the appended specification, claims and drawings, in which:

Figure 1 illustrates, somewhat diagrammatically, a jet engine suitable for use on aircraft, and certain portions of a control system adapted for use therewith, and Fig. 2 illustrates, somewhat diagrammatically, the remainder of the control system embodying my invention of which part is shown in Fig. 1.

Referring to the drawings, there is shown in Fig. 1 a jet engine including a casing 10, an air inlet 12, a multiple stage compressor 14, a compressor rotor shaft 16, a combustion chamber 18, which is one of a number of such chambers, and one of a corresponding number of fuel discharge nozzles 20. These nozzles are connected to a generally circular manifold 22 by means of conduits 24. There is also shown a multiple stage turbine 26, a turbine rotor shaft 28 connected to the compressor shaft 16, and a tail pipe 30 for discharging products of combustion from turbine 26. The shafts 16 and 28 are supported by a center bearing 32 and a rear end bearing 34, both of which are supported by the casing 10. A front end bearing is provided for the shaft 16, but is not shown in the drawing. A propeller 40 is connected to the shaft 16 by means of a gear train generally shown at 42. This gear train may also be utilized for operating the fuel pump and other accessories.

Fuel for the engine comes from a tank (not shown) and passes through a conduit 43, a variable delivery pump 44, conduit 46, a cut-off valve mechanism 48, and a conduit 50 leading to the fuel manifold 22.

The cut-off valve 48 includes a piston 52 adapted to block the passageway between conduits 46 and 50. The piston valve 52 is biased to open position by means of a spring 54 and is operable to closed position against the spring 54 by means of an electrical solenoid 56. Energization of solenoid 56 attracts an armature 58 connected to piston valve 52 by a stem 60. Associated with the cut-off valve mechanism 48 is a latching solenoid 62, which operates a plunger 64 biased by a spring 66 to a position adjacent the armature 58.

Energization of solenoid 56 is controlled by a push-button switch 68, marked with the legend "Fuel Off" in the drawing. Energization of solenoid 62 is controlled by a push-button switch 70, marked with the legend "Fuel On" in the drawing.

When switch 68 is closed, a circuit is completed which may be traced from the upper terminal of a battery 72, through a conductor 74, switch 68, conductors 76 and 78, solenoid 56, and ground connections 80 and 82 to the lower terminal of battery 72. Energization of solenoid 56 raises the armature 58, placing piston 52 in a position to block the flow of fuel to the engine. When this occurs, the plunger 64 is biased by spring 66 so that it moves under armature 58, thereby retaining piston 52 in the fuel cut-off position.

When it is desired to permit the flow of fuel to the engine, switch 70 is closed. This completes a circuit which may be traced from the upper terminal of battery 72, through conductor 84, switch 70, conductor 86, solenoid 62, and ground connections 80 and 82 to the lower terminal of battery 72. This energizes solenoid 62, causing plunger 64 to be withdrawn to the right so that armature 58 and valve 52 move downward under the influence of spring 54, thereby permitting the flow of fuel to the engine. The construction is such that only a momentary closure of either switch 68 or switch 70 is needed to establish the desired condition of the fuel cut-off valve mechanism 48. After switch 68 has been momentarily closed, the fuel remains cut off until switch 70 is closed. Similarly, after switch 70 is momentarily closed, fuel flow is permitted until switch 68 is again operated.

The delivery of pump 44 may be varied by means of a delivery control 90, which includes a piston 92, biased downwardly by a spring 94. Fluid under pressure acting on the under side of piston 92 moves it upwardly in opposition to spring 94. The space above piston 92 is vented, as indicated at 96.

The fluid pressure acting upwardly on piston 92, hereinafter referred to as the variable control oil pressure, may be varied in response to a number of interacting control devices to be described in detail hereinafter. These devices include a manually operable fuel cam 95, a speed responsive device 97 which is adjustable by means of a manually operated speed cam 98, and a pair of bellows 100 and 102 which together respond to an air pressure differential in the engine.

The bellows 100 has its upper end attached to a fixed support 104, and its lower end attached to an end plate 106. The support 104 and plate 106 are connected by a tension spring 108. Air at the pressure existing at the discharge end of compressor 14 is conveyed to the interior of bellows 100 through a conduit 110.

The bellows 102 has its lower end mounted on a fixed support 112, and its upper end closed by a fixed plate 114. Air at the static pressure existing at the inlet to the compressor 14 is conveyed to the interior of bellows 102 by means of a conduit 116. The plates 106 and 114 are connected by a rigid rod 118.

A lever 120 is pivoted near its center on the rod 118. The left end of lever 120 is connected by means of a pin-and-slot connection to a valve stem 122. The stem 122 extends into and operates a piston valve mechanism 124, of conventional construction, which controls the flow of hydraulic fluid to the opposite ends of a hydraulic servo piston 126.

Hydraulic fluid for operating the servo piston 126 comes from a suitable reservoir (not shown) and flows through a pump 128, which may be engine-driven, and which is provided with a discharge pressure regulating relief valve 130. From the pump 128, the fluid, which may be a suitable oil, flows through a conduit 132 to the valve 124. Fluid may pass from the valve 124 to the oil reservoir through drain connections 134 and 136.

The servo piston 126 operates a rod 138, which is connected through pin-and-slot connections to the right end of lever 120, and to bell-crank levers 140 and 142.

Upon an increase in the differential between the compressor discharge pressure and the compressor inlet pressure, bellows 100 is expanded, thereby moving rod 118 downward. Lever 120 pivots about its right end, thereby moving stem 122 downward and operating the valve mechanism 124 to supply fluid at high pressure to the upper end of servo piston 126 and to connect the lower end of servo piston 126 to the drain conduit 134. This causes the servomotor to move rod 138 downward, thereby pivoting lever 120 about its center and raising the valve stem 122. This operation continues until the valve 124 is restored to its original position, wherein no fluid is supplied to servo piston 126.

It may therefore be seen that the valve 124 and servo piston 126 operate to supply a power boost for the bellows 100 and 102, so that the work done as a result of their deflection need not be supplied by the bellows themselves, but is supplied by the oil pressure.

The bell-crank lever 140 is pivotally mounted on a fixed support 144, and its lower end is pivotally connected to a link 146 which carries at its end a circular bearing 148. The bearing 148 slidably contacts on its opposite surfaces a pair of levers 150 and 152. The right end of lever 150 is pivoted on a fixed support 154. The left end of lever 150 is biased downwardly by a spring 156 retained between the end of lever 150 and the fixed support 144.

The left end of lever 152 is pivotally attached to a fixed support 157. Its right end is connected through a pin-and-slot connection to a piston rod 158. Rod 158 is connected to a piston 160 in a motor device 162. The chamber above piston 160 in the motor device 162 is vented to atmosphere at 164. The space below piston 160 in the cylinder 162 is supplied with fluid under pressure through a conduit 166.

The position of piston 160 is determined by the balance between the pressure under it acting upward and the force of spring 156, which acts downwardly on piston 160 through the lever 150, bearing 148, lever 152, and rod 158. It may be seen that the lateral position of bearing 148 determines the mechanical advantage between spring 156 and the piston 160.

The pressure below the piston 160 is controlled by a valve mechanism 168, of generally conventional construction. The valve mechanism 168 includes a piston valve having two lands which, in the position shown in the drawing, lie on the opposite sides of a central port leading through conduits 170 and 166 to the chamber below the piston 160. The conduit 166 is also connected through a conduit 172 to the chamber below the piston 92 in the fuel pump delivery control. When the piston valve 168 is moved downward from the neutral position illustrated in the drawing, it admits high pressure fluid from the pump 128 through conduits 174, 176 past valve 168 into conduits 170, 172 and 166, thereby increasing the pressure under the pistons 92 and 160. When the valve is moved upwardly from its neutral position, it connects the spaces under pistons 92 and 160 to a drain conduit 178.

The valve 168 is operated by a stem 180, whose upper end is pivoted to a lever 182. The left end of lever 182 is connected through a pin-and-slot connection to the piston rod 158. The right end of lever 182 is spaced slightly above, but may be operated by the fuel cam 95. A spring 184 is retained between lever 182 and fixed support 186, and biases the lever 182 downwardly toward the cam 95. The right extremity of lever 182 is engaged by a lug 187 on a rod 188 operated by a piston 190 in a speed responsive motor device 192.

It may be seen that when the valve 168 is moved downwardly from the position shown, fluid under high pressure is admitted from conduit 176 into conduit 170 and thence through conduit 166 to the chamber under piston 160, thereby raising piston 160 and rod 158, which movement is transmitted through lever 182 back to stem 180 and valve 168 to restore it to its neutral position. Similarly, upward movement of valve 168 results in a downward movement of piston 160.

The speed responsive device 97 includes a pair of flyballs 192. The flyballs are mounted on a head 194 driven by the engine through suitable gearing. The inner ends of the L-shaped flyballs act on a vertically movable rod 196 which is attached at its upper end to a sleeve 198 slidable within a stationary cylinder 200. The lower end of rod 196 extends through the head 194 and is engaged by one end of a tension spring 202. The other end of spring 202 engages a lever 204 which is pivotally mounted at its left end on a fixed support 206. The speed cam 98 engages an intermediate point of lever 204.

A piston valve 208 moves within the sleeve 198, and is connected to a stem 210 which extends upwardly to a point of pivotal attachment with a lever 212. A pin-and-slot connection is used between stem 210 and lever 212. The right end of lever 212 is pivotally attached to a fixed support 214, and its left end is engaged by a lug 216 attached to the rod 188. A spring 211 biases stem 210 downwardly.

The tension of spring 202 may be set by manipulation of cam 98, and determines the speed of the engine at which the sleeve 198 is held by the flyballs in the neutral position wherein the port leading to conduit 218 is blocked. If the engine speed increases above the value determined by the cam setting, then the flyballs 192 move the rod 196 upwardly against the spring 202, thereby moving the sleeve 198 upwardly and admitting fluid at high pressure from conduit 174 to a conduit 218 leading to the space under the piston 190. This increases the pressure under piston 190, moving the rod 188 upwardly. This motion is transmitted through lug 216 and lever 212 to the valve stem 210, causing the latter to move upwardly until the valve 208 again blocks the ports leading to conduit 218.

Similarly, if the speed falls below the previously selected value, then the conduit 218 is vented to low pressure through the space below the piston valve 208, the space below the sleeve 198, and the drain connection 220. The valve mechanism 198, valve 208 and the motor device 192 together operate to increase the power available to move the piston rod 188 and its associated mechanism. By the use of the valve and motor device, the power moving the rod 188 is taken from the engine driven pump, rather than from the flyball governor device 97.

When fluid under high pressure is admitted to conduit 218, thereby piston 190 is raised until lug 187 engages the end of lever 182, raising the latter and valve 168 to reduce the flow of fuel to the engine. If the engine speed drops below the value selected by the tension of spring 202, then the port leading to conduit 218 is connected to the drain, and piston 190 is lowered. Downward movement of piston 190 causes rod 188 and lug 187 to move downward, and the lever 182 follows this downward movement until its motion is limited by the cam 95. This downward movement of lever 182 moves the valve stem 180 in a fuel flow increasing direction. The cam 95 therefore limits the fuel available to increase the engine speed to its selected value. The cam 95 may therefore be said to limit the rate of acceleration of the engine.

Means are provided to limit the fuel flow whenever the engine exhaust temperature exceeds a predetermined value. This means includes a thermostatic valve controlled by the engine exhaust temperature and indicated diagrammatically at 222. The valve 222 controls a motor device 224. The device 224 includes a piston 226 biased downwardly by means of a spring 228. The space under the piston 226 is connected through a valve 222 and a conduit 230 to the fluid supply conduit 174 whenever the valve 222 is open. A restricted drain conduit 232 is provided for this space. Whenever valve 222 is open, pressure builds up under the piston 226 because of the restriction 232. If the temperature approaches an unsafe value, the valve 222 opens, increasing the pressure under piston 226 and raising the rod 234 until its upper end engages the lever 182 and moves it upwardly in a fuel flow decreasing direction.

*Torque control*

The main portion of the torque control is shown in Fig. 2, but certain parts of the torque control of Fig. 2 are repeated in Fig. 1 to show their relationship to the other elements of Fig. 1.

The torque control apparatus utilizes a torque meter, generally indicated at 250 in Fig. 2, which may be of any suitable type. For example, a torque meter such as that shown incidentally in the copending application of Leighton Lee II, Serial No. 654,979, filed March 16, 1946, now Patent No. 2,450,835, may be used. This type of torque meter provides a fluid pressure which varies in accordance with the output torque of the engine. This fluid pressure is communicated through a conduit 252 to a chamber 254 under a piston 256 in a control valve mechanism generally indicated at 258. Piston 256 acts upwardly on the stem 260 of a conventional piston valve 262. The valve 262 controls the application of fluid pressure from the supply line 132 through a conduit 264 selectively to conduits 266 and 268 leading to the propeller pitch control mechanism. The upper end of stem 260 is connected through a pin-and-slot connection to a lever 270 (Fig. 1). A bearing 272 carried by a link 274 rides on the upper surface of lever 270. The other end of link 274 is connected to the bell crank lever 142. The upper surface of bearing 272 engages a lever 276, pivotally mounted at its center on the fixed support 157. A tension spring 278 engages the opposite end of lever 276 and also the end of a lever 280, which is pivotally mounted at its left end on the fixed support 157 and is engaged near its center by a torque cam 282. The angular position of cam 282 determines the loading of spring 278, which spring acts through lever 276, bearing 272, lever 270 and stem 260 and tends to move the stem 260 downward, in opposition to the fluid pressure acting upwardly on piston 256. Whenever the torque has a value determined by the setting of spring 278, as modified by the position of bearing 272, then the valve 262 is in its neutral position, shown in the drawings, in which it supplies no fluid under pressure to the propeller pitch control mechanism. If the torque departs from the desired value, then the valve 262 moves upwardly or downwardly to exert a controlling influence on the propeller pitch control.

The conduits 266 and 268 lead (see Fig. 2) through a selector valve 284, conduits 286 and 288, respectively, to a hydraulic servomotor 290, which is directly connected to the propeller blade angle control 292. The latter control may be of any suitable construction, and is indicated schematically in the drawings.

The selector valve 284 determines whether the hydraulic servomotor 290 is controlled by the control valve 258 or by another control valve mechanism 294. The control valve mechanism 294 includes a stationary cylinder 296, in which moves a slidable sleeve 298. The sleeve 298 is connected to a rod 300, which is connected by a pin-and-slot connection to a lever 302. A fixed fulcrum is provided for the lever 302 at 304, and its right end is connected by means of a pin-and-slot connection to a rod 306 positioned by the piston of servomotor 290. Inside the sleeve 298 slides a piston valve 308, which is moved by a cam 310, termed the pitch cam. The stem 312 of valve 308 is connected by means of a pin-and-slot connection to one end of a lever 314. The lever 314 has a fixed central fulcrum 316, and its left end is connected by means of a pin-and-slot connection to the armature 318 of a solenoid 320. A spring 322 biases the armature 318 upwardly, and thereby maintains stem 312 in contact with cam 310.

When solenoid 320 is energized, armature 318 is drawn downward, and stem 312 is moved upward away from cam 310, thereby moving valve 308 to a position in which it causes servomotor 290 to move the propeller blades to their feathered position.

The selector valve mechanism 284 includes a piston valve 324 connected by a stem 326 to an armature 328 of a solenoid 330. A spring 332 biases the armature 328 and stem 326 upwardly to the position shown in the drawing. When the valve 324 is in the position shown, the conduits 286 and 288 leading to the servomotor 290 are connected to conduits 266 and 268 leading from the control valve mechanism 256. When solenoid 330 is energized, the conduits 286 and 288 are connected to the conduits 336 and 338 leading from the control valve mechanism 294.

Hydraulic fluid under pressure is supplied to the control valve mechanism 294 through a conduit 340. Conduit 340 receives fluid either from conduit 132 through a check valve 342 or from a conduit 344 through a check valve 346. Fluid under pressure is supplied to conduit 344 by means of a pump 348 driven by an electric motor 350.

When it is desired to feather the propellers, a push-button switch 352 is depressed. This completes four electrical circuits, one for energizing solenoid 330, another for energizing solenoid 320, a third for energizing the fuel-off control of Fig. 1, and a fourth for energizing the motor 350 to drive pump 348. The circuit for energizing solenoid 330 may be traced from the lower end of battery 354 through switch 352, conductors 356 and 358, solenoid 330, and ground connections 360 and 362 to the upper terminal of battery 354. Energization of solenoid 330 moves stem 326 and valve 324 downwardly, placing control valve 294 in control of servomotor 290.

At the same time, solenoid 320 is energized through a circuit which may be traced from the lower terminal of battery 354 through switch 352, conductor 364, solenoid 320, and ground connections 360 and 362 to the upper terminal of battery 354. Energization of solenoid 320 moves valve 308 to a position to cause operation of the propeller blades in a feathering direction.

The energizing circuit for the fuel-off control of Fig. 1 is energized at the same time and may be traced from the lower terminal of battery 354, through switch 352, conductor 364, conductors 366 and 78 (see Fig. 1), solenoid 56, and ground connections 80 and 362 to the upper terminal of battery 354. This cuts off the flow of fuel to the engine, which might otherwise overheat when the engine is slowed down excessively by the high load placed on it by feathering the propeller.

The energizing circuit for motor 350 may be traced from the lower terminal of battery 354, through switch 352, conductors 370 and 372, motor 350, and ground connections 374 and 362 to the upper terminal of battery 354. Energization of motor 350 causes pump 348 to operate. This insures that the servomotor 290 will receive an adequate supply of motive fluid under pressure, even though the engine driven pump may stop during the feathering operation because of the cutting off of fuel to the engine.

When it is desired to unfeather the propeller, a push button switch 376 is depressed. This completes energizing circuits for the motor 350 and the solenoid 330. The energizing circuit for motor 350 may be traced from the lower terminal of battery 354 through switch 376, conductors 378 and 372, motor 350, and ground connections 374 and 362 to the upper terminal of battery 354. This insures the supply of motor fluid for the hydraulic pitch control mechanism.

The energization of solenoid 330 is accomplished through a circuit which may be traced from the lower terminal of battery 354 through switch 376, conductors 380 and 358, solenoid 330, and ground connections 360 and 362 to the upward terminal of battery 354. Energization of solenoid 330 places servomotor 290 under control of valve mechanism 294. The valve mechanism 294 is left under control of the pitch cam 310, since the solenoid 320 is not energized. The propeller is therefore driven away from the feathering position to a position determined by the setting of the pitch cam.

The speed cam 98, the fuel cam 95, the pitch cam 310, and the torque cam 282 are all positioned simultaneously by a single manual control lever 382, as indicated in Fig. 2. A cam 384 operating a switch 386 is also positioned by the control lever 382.

The control lever 382 is movable over a range indicated by a quadrant 388 in the drawing. When the control lever 382 is at any position between the central position shown in the drawing and the extreme left-hand position on the quadrant 388, then the speed is determined in accordance with the cam 98, the fuel flow is set in accordance with the cam 95, and the torque is established by cam 282. Since solenoid 330 is then not energized, the selector valve places the propeller pitch control subject to the control of the valve mechanism 258, which in turn is regulated by torque control. The pitch cam then has no effect on the particular pitch obtained, but the pitch control operates to secure the selected value of torque.

When the manual lever 382 is moved to the right from the central position shown, the cam 384 closes switch 386, thereby completing an energizing circuit for solenoid 330. This circuit may be traced from the upper terminal of a battery 390 through switch 386, conductor 358, solenoid 330, and ground connections 360 and 392 to the lower terminal of battery 390. Energization of solenoid 330 operates the selector valve 284 to place the pitch control under the regulation of valve mechanism 294 rather than valve mechanism 258. This makes the pitch control subject to the pitch cam 310 rather than to the torque cam 282.

The range of positions of the manual lever 382 between the central position shown and the position indicated by the dotted line marked A in the drawings is intended for use under landing conditions. In this range of positions, the speed cam and the fuel cam operate to reduce their respective variables and the pitch cam operates to reduce the pitch gradually toward flat, or zero pitch.

The range of positions of the manual lever 382 between the dotted lines A and B in the drawing is intended for idle and starting operation of the engine. In this range, the speed and fuel cams are set at preselected minimum values, and the pitch cam maintains the propeller pitch setting at zero.

When the manual lever 382 is moved to the right of the dotted line B indicated in the drawing, then the speed and fuel cams operate to gradually increase their respective variables and the pitch cam operates to reverse the pitch of the propeller so that it may be used for braking purposes.

The dotted lines A and B appearing on the respective cams in Fig. 2 indicate the particular portion of the cam which will be engaged by its associated follower when the manual control lever 382 is moved to the position corresponding to the line A.

Although three separate batteries are shown in the drawings, these are shown only to simplify the wiring diagrams. In any practical construction, a single suitable source of electrical energy would be used.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Control apparatus for a variable pitch propeller, comprising propeller pitch varying means, an internal combustion engine driving the propeller, a control device manually movable sequentially through first and second ranges of positions, first means responsive to the position of said control device when said device is in said first range of positions to operate said pitch varying means to produce a selected value of propeller torque corresponding to a selected position of said control device, under varying engine operating conditions, and second means responsive to a selected position of said control device when said device is in said second range of positions to operate said pitch varying means to produce a selected propeller pitch angle corresponding to the position of said control device, under varying engine operating conditions.

2. Control apparatus as in claim 1, including means operable independently of the position of said control device to operate said pitch varying means in feathering and unfeathering directions.

3. Control apparatus for an internal combustion engine and a variable pitch propeller driven thereby, comprising propeller pitch varying means, fuel supply controlling means, propeller torque measuring means, a manually movable control device, means responsive to the position of said control device for operating said fuel supply controlling means, means responsive to the position of said control device and to said torque measuring means for operating said pitch varying means to produce a value of torque determined by the position of said control device, and means operable independently of the position of said control device to operate said pitch varying means selectively in feathering and unfeathering directions.

4. Control apparatus as in claim 3, including means responsive to the speed of said engine for additionally regulating the supply of fuel to said engine, and means responsive to the position of said control device for varying the response characteristic of said speed responsive means.

5. Control apparatus as in claim 3, including means for cutting off the supply of fuel to said engine independently of said fuel supply controlling means, and interlocking means connecting said fuel cut-off means and said feathering means to insure that the fuel is cut off whenever the propeller is feathered.

6. Control apparatus for an internal combustion engine and a variable pitch propeller driven thereby, comprising propeller pitch varying means, means for cutting off the supply of fuel to said engine, means for operating said pitch varying means to feather said propeller, and interlocking means connecting said fuel cut-off means and said operating means to insure that the fuel is cut off whenever the propeller is feathered.

7. Control apparatus as in claim 6, wherein said interlocking means responds to a feathering operation of said operating means to make said cut-off means effective.

8. Control apparatus for a variable pitch propeller, comprising propeller pitch varying means, motor means for driving said pitch varying means, first and second motor control means, transfer means for selectively placing one or the other of said motor control means in control of said motor means, a control device manually movable through first and second ranges of positions, propeller torque measuring means, means including said torque measuring means and said control device for operating said first motor control means, said first motor control means being effective when in control of said motor means to operate said pitch varying means to produce a value of propeller torque determined by the position of said control device, means including said control device and a follow-up connection to said motor means for operating said second motor control means, said second motor control means being effective when in control of said motor means to operate said pitch varying means to produce a value of propeller pitch angle determined by the position of said control device, and means responsive to the position of said control device for operating said transfer means to place said first and second control means in control of said motor means when said control device is in its first and second ranges of positions, respectively.

9. Control apparatus as in claim 8, in which each of said motor control means include two relatively movable control elements and is effective upon opposite relative movements of said elements from a normal position to cause motor operation in opposite directions, said operating means for said first motor control means includes means to apply to one of the control elements thereof a positioning force varying with the position of said control device when the latter is in said first range of positions and indicative of a desired value of propeller torque, said torque measuring means applies to said one element an opposite positioning force varying with the propeller torque, and said operating means for said second motor control means includes means for moving one of the control elements thereof concurrently with said control device and means for moving the other control element thereof concurrently with said motor means.

10. Control apparatus as in claim 8, in which said motor means is a hydraulic motor comprising a pair of expansible chambers separated by a movable wall, and each said motor control means includes cooperating valve and seat elements which selectively control the flow of fluid to and from said chambers.

11. Control apparatus as in claim 8, in which said transfer means includes a transfer control element, means biasing said transfer control element to a first position in which said first motor control means controls said motor means, electrical motor means for operating said transfer control element against said biasing means to a second position in which said second motor control means controls said motor means, and said means for operating said transfer means includes switch means operable to closed position by movement of said control device to said second range of positions for controlling the energization of said electrical motor means.

12. Control apparatus as in claim 8, including means for operating said second motor control means independently of said control device to cause operation of said motor means in a direction to feather said propeller.

13. Control apparatus as in claim 8, in which said motor means is a hydraulic motor comprising a pair of expansible chambers separated by a movable wall, each said motor control means includes cooperating valve and seat elements which selectively control the flow of fluid to and from said chambers, said transfer means includes a transfer valve, means biasing said transfer valve to a first position in which said first motor control means controls said motor means, and first electrical motor means for operating said transfer valve against said biasing means, said operating means for said second motor control means includes means for moving one of the cooperating elements thereof concurrently with said control device and means for moving the other cooperating element concurrently with said motor means, and including second electrical motor means for moving said one cooperating element independently of said control device to a position to cause operation of said hydraulic motor in a direction to feather the propeller, feathering control means for simultaneously energizing both said first and second electrical motor means, and unfeathering control means for energizing said first motor control means.

14. Control apparatus for an internal combustion engine and a variable pitch propeller driven thereby, comprising engine fuel supply controlling means, propeller pitch varying means, hydraulic motor means for operating said pitch varying means including a piston translatable in a cylinder, propeller torque measuring means, a manually movable control device, means responsive to the position of said control device for operating said fuel supply controlling means, first motor control valve means for controlling said hydraulic motor means, means including said manually movable control device and said torque measuring means for operating said first motor control valve means so that said motor operates to produce a value of propeller torque determined by the position of said control device, second motor control valve means, manually controlled means movable independently of said control device for operating said second motor control valve means so that said motor operates said pitch changing means in a feathering direction, and means effective upon operation of said manually controlled means to interrupt control of said motor means by said first motor control valve means and to place said second motor control valve means in control of said motor means.

15. Control apparatus for a variable pitch propeller, comprising propeller pitch varying means, propeller torque measuring means, a manually movable control device, means including said torque measuring means and said control device for operating said pitch varying means to produce a value of propeller torque determined by the position of said control device, and electrically actuated means, operable independently of the position of said control device, to operate said pitch varying means in a direction to feather said propeller.

16. Control apparatus for a variable pitch propeller, comprising propeller pitch varying means, a control device manually movable through first and second ranges of positions, first means responsive to the position of said control device when said device is in said first range of positions to operate said pitch varying means to produce a value of propeller torque determined by the position of said control device; second means responsive to the position of said control device when said device is in said second range of positions to operate said pitch varying means to produce a propeller pitch angle determined by the position of said control device; and means responsive to said control device for making said first and second means responsive as respectively recited when said control device is manually moved from its first to its second range of positions.

17. Control apparatus as in claim 16, in which said propeller is driven by an internal combustion engine, and including means responsive to the position of said control device for regulating the supply of fuel to said engine.

18. Control apparatus as in claim 17, including means responsive to the speed of said engine for automatically regulating the supply of fuel to said engine, and means responsive to the position of said control device for varying the response characteristic of said speed responsive means.

19. Control apparatus as in claim 16, including means operable independently of the position of said control device to operate said pitch varying means in feathering and unfeathering directions.

20. Control apparatus for a variable pitch propeller driven by an internal combustion engine, comprising: propeller pitch varying means; a control device manually movable sequentially through first and second ranges of positions, first means responsive to the position of said control device, when said device is in said first range of positions to operate said pitch varying means to produce a selected value of propeller torque corresponding to a selected position of said control device; second means responsive to a selected position of said control device when said device is in said second range of positions to operate said pitch varying means to produce a selected propeller pitch angle, corresponding to the selected position of said control device; means responsive to the position of said control device for regulating the supply of fuel to said engine; means responsive to the speed of said engine for additionally regulating the supply of fuel to said engine; and means responsive to the position of said control device for varying the response characteristic of said speed responsive means.

JAMES S. WOODWARD.

References Cited in the file of this patent

UNITED STATES PATENTS

| Number | Name | Date |
|---|---|---|
| 2,205,625 | Mader | June 25, 1940 |
| 2,216,416 | Mader | Oct. 1, 1940 |
| 2,217,364 | Halford et al. | Oct. 8, 1940 |
| 2,248,245 | MacClain | July 8, 1941 |
| 2,303,998 | Holley | Dec. 1, 1942 |
| 2,306,953 | Jung | Dec. 29, 1942 |
| 2,308,228 | Matteucci | Jan. 12, 1943 |
| 2,322,303 | Martin | June 22, 1943 |
| 2,396,618 | Stieglitz et al. | Mar. 12, 1946 |
| 2,402,065 | Martin | June 11, 1946 |

FOREIGN PATENTS

| Number | Country | Date |
|---|---|---|
| 465,571 | Great Britain | May 10, 1937 |

OTHER REFERENCES

Publication, "Hamilton Standard Propellers Service Manual," No. 140-A; published by Hamilton Standard Propellers, East Hartford, Conn.